A. H. BATES.
ROAD MAP.
APPLICATION FILED MAR. 27, 1916.
1,184,301.
Patented May 23, 1916.
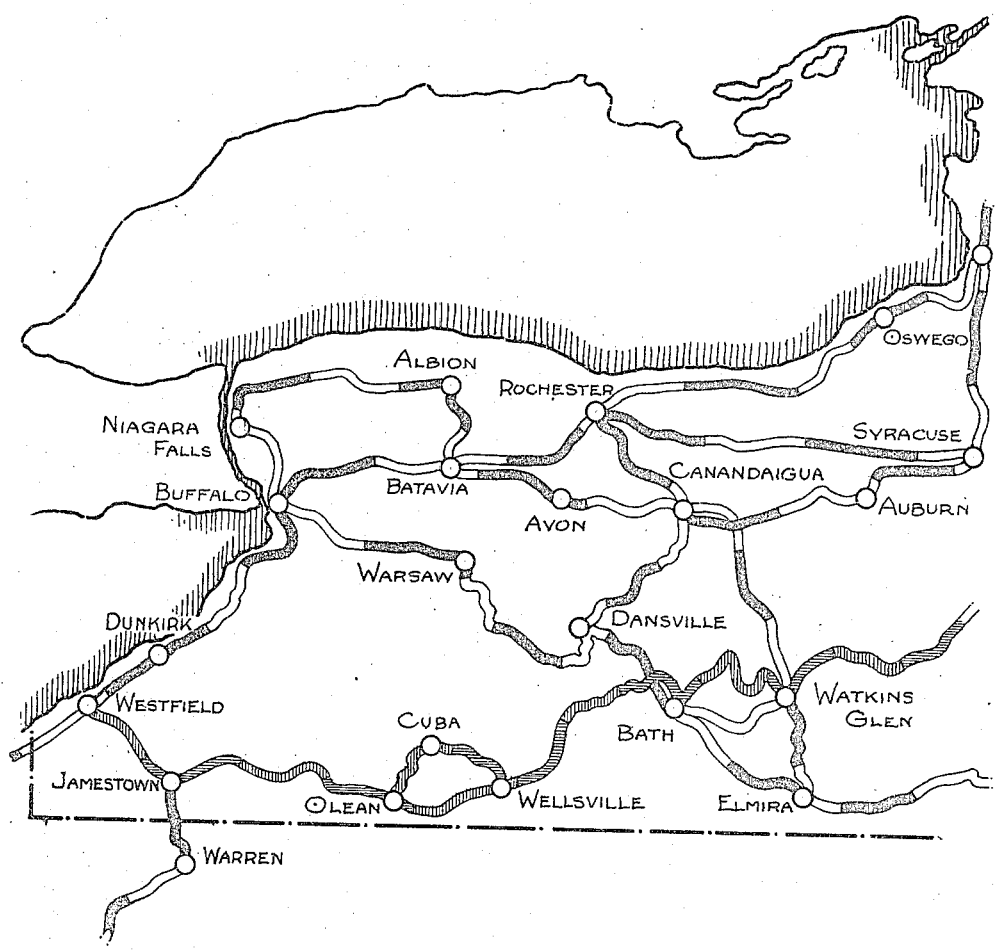
INVENTOR
Albert H. Bates

UNITED STATES PATENT OFFICE.

ALBERT H. BATES, OF CLEVELAND HEIGHTS, OHIO.

ROAD-MAP.

1,184,301.

Specification of Letters Patent.

Patented May 23, 1916.

Application filed March 27, 1916. Serial No. 86,887.

*To all whom it may concern:*

Be it known that I, ALBERT H. BATES, a citizen of the United States, residing at Cleveland Heights, in the county of Cuyahoga and State of Ohio, have invented a certain new and useful Improvement in Road-Maps, of which the following is a full, clear, and exact description, reference being had to the accompanying drawings.

This invention relates to road maps intended primarily for the use of automobilists, motor cyclists, etc., and the object is to provide a map which will show at a glance not only the different routes, but the distance between any two points on a selected route. I accomplish this object by providing on the map route lines following the general course which the route indicated follows, and I divide such lines into successive portions having a different appearance, each portion representing the same definite number of miles. The designations may consist of different forms of the same color or different colors, and the subdivisions may conveniently be made every twenty miles, for example. Each subdivision represents the true mileage of the route, though it frequently happens that the small bends, twists and detours of a road, which greatly lengthen its real mileage, are not apparent on any map covering any large amount of territory. Accordingly, with my map, though the successively different portions of the route line each indicate the same mileage, they will frequently appear as different lengths on the map. With such a map as described, the automobilist can see at a glance approximately the distance between any two points. Knowing his own location at any time he can form an approximate estimate as to the time when he may expect to reach any other point on the map simply by a glance at the map, and without measuring by any scale of miles or referring to any description.

The drawing illustrates a map made in accordance with my invention, wherein there are various route lines, each subdivided into portions having successively different appearance and representing the same number of miles. I find it very convenient to use twenty miles as the unit, and this is approximately the scale shown in the drawing. As the ordinary touring speed of an automobilist is approximately twenty miles an hour, the twenty mile subdivision corresponds approximately to an hour subdivision, and thus the automobilist can read his route directly in hours without computation.

In the drawing some of the route lines are shown as alternately solid black and parallel black lines, separated by a white space. This is illustrative of any different appearance produced by a different form of line. The lower part of the drawing has a route from "Westfield" to "Watkins Glen", wherein the successive portions are sectioned conventionally to indicate red and blue, this being intended to illustrate a designation consisting of successively changing color units.

Each unit in the specific map shown is intended to represent approximately twenty miles. It will be noticed that between "Rochester" and "Syracuse", for example, the unit is considerably longer in appearance than in the vicinity of "Dansville". This indicates to the automobilist that the roads are full of bends around "Dansville", and suggests the character of the topography he may expect. At the same time he is not misled by the comparative closeness of "Dansville" and "Canandaigua" on the map (as he would be if he attempted to apply a fixed scale of miles to the map), and he obtains his real distance by observing the number of alternately appearing subdivisions between the two points. It will thus be seen that all the automobilist has to do is to observe the number of subdivisions between two points (making a mental estimate of the fractional parts of the subdivisions if necessary), to see at a glance the distance and approximate time between any points. Moreover, an unusually short sub-division indicates a sinuous or detouring road with its concomitant topography.

One of the advantages of my map is that it may be readily inspected while the car is running, when the motion interferes with reading a description. It may also be seen in a much dimmer light than is necessary for reading a description. My map may be cheaply printed, and is very effective in furnishing the desired information without requiring the user to look elsewhere than on the map itself.

Having thus described my invention, what I claim is:

1. A road map having lines to designate different routes, said lines being subdivided into successively differently appearing portions, each portion representing the same distance.

2. A road map having designations of towns and lines connecting them, the lines being subdivided into successively differently appearing portions designating the distance.

3. A road map consisting of town designations and lines connecting them, the lines being subdivided longitudinally into different portions of successively different appearance, each portion representing substantially the same actual road distance though the dimensions of the portions may vary on the map.

4. In a road map, the combination of designations of towns and cities and route lines connecting the same and following approximately the course of highways between such points, the route lines being subdivided into portions of successively different appearance, the actual length of such portions on the map varying according to the topography of the country traversed to make them indicate a substantially accurate distance on the route, whereby a shorter subdivision indicates a topography requiring a sinuous road.

In testimony whereof, I hereunto affix my signature.

ALBERT H. BATES.

Copies of this patent may be obtained for five cents each, by addressing the "Commissioner of Patents, Washington, D. C."